(12) United States Patent
Zahniser et al.

(10) Patent No.: US 7,006,674 B1
(45) Date of Patent: Feb. 28, 2006

(54) APPARATUS AND METHODS FOR VERIFYING THE LOCATION OF AREAS OF INTEREST WITHIN A SAMPLE IN AN IMAGING SYSTEM

(75) Inventors: David J. Zahniser, Wellesley, MA (US); Theodore S. Geiselman, Bolton, MA (US)

(73) Assignee: Cytyc Corporation, Marlborough, MA (US)

( * ) Notice: Subject to any disclaimer, the term of this patent is extended or adjusted under 35 U.S.C. 154(b) by 0 days.

(21) Appl. No.: 09/430,198

(22) Filed: Oct. 29, 1999

(51) Int. Cl.
G06K 9/00 (2006.01)

(52) U.S. Cl. .................... 382/128; 382/287; 382/291; 702/95

(58) Field of Classification Search ................ 382/128, 382/133, 134, 287, 291
See application file for complete search history.

(56) References Cited

U.S. PATENT DOCUMENTS

| | | |
|---|---|---|
| 3,600,057 A | 8/1971 | Leffler |
| 4,513,438 A * | 4/1985 | Graham et al. ............. 382/134 |
| 4,690,521 A | 9/1987 | Saccomanno |
| 4,807,979 A | 2/1989 | Saccomanno et al. |
| 5,000,554 A * | 3/1991 | Gibbs ........................ 359/393 |
| 5,408,535 A | 4/1995 | Howard, III et al. |
| 5,427,910 A | 6/1995 | Kamentsky et al. |
| 5,428,690 A | 6/1995 | Bacus et al. |
| 5,499,097 A | 3/1996 | Ortyn et al. |
| 5,532,874 A | 7/1996 | Stein |
| 5,552,892 A * | 9/1996 | Nagayama .................. 356/401 |
| 5,561,556 A | 10/1996 | Weissman |
| 5,574,594 A | 11/1996 | Fowler et al. |
| 5,581,487 A | 12/1996 | Kelly et al. |
| 5,581,631 A | 12/1996 | Ortyn et al. |
| 5,587,833 A | 12/1996 | Kamentsky |
| 5,602,674 A | 2/1997 | Weissman et al. |
| 5,655,029 A | 8/1997 | Rutenberg et al. |
| 5,659,421 A | 8/1997 | Rahmel et al. |

(Continued)

FOREIGN PATENT DOCUMENTS

EP 0 849 765 A2 6/1998

(Continued)

*Primary Examiner*—Samir Ahmed
*Assistant Examiner*—Charles Kim
(74) *Attorney, Agent, or Firm*—Bingham McCutchen LLP

(57) ABSTRACT

An apparatus and method for verifying the location of an area of interest within a sample are disclosed. An imaging system includes an optical system and a stage movable relative to the optical system. A computer server is in communication with the imaging system and with a review station. The imaging system is capable of spatially locating a datum mark on the sample and determining a spatial offset value of the mark relative to a nominal position thereof. The coordinate systems of a respective one of the imaging system and the review station can be standardized. The method includes locating a datum mark on the sample, and identifying an area of interest within the sample. The method further includes determining the location of the area of interest relative to the mark. The method further includes locating again the datum, and checking that a dimensional error in locating the datum mark is less than a tolerance value to verify location of the area of interest.

17 Claims, 4 Drawing Sheets

U.S. PATENT DOCUMENTS

| | | |
|---|---|---|
| 5,694,212 A | 12/1997 | Weissman |
| 5,717,778 A | 2/1998 | Chu et al. |
| 5,740,269 A | 4/1998 | Oh et al. |
| 5,757,954 A | 5/1998 | Kuan et al. |
| 5,790,308 A | 8/1998 | Kamentsky |
| 5,793,969 A | 8/1998 | Kamentsky et al. |
| 5,812,692 A | 9/1998 | Rosenlof et al. |
| 5,833,794 A | 11/1998 | Mayer |
| 5,963,368 A | 10/1999 | Domanik et al. |
| 5,978,498 A | 11/1999 | Wilhelm et al. |
| 6,049,421 A | 4/2000 | Raz et al. |
| 6,151,139 A | 11/2000 | Haded et al. |
| 6,226,392 B1 | 5/2001 | Bacus et al. |
| 6,249,593 B1 | 6/2001 | Chu et al. |

FOREIGN PATENT DOCUMENTS

| | | |
|---|---|---|
| JP | 08029693 | 2/1996 |
| JP | 09073033 | 3/1997 |
| WO | WO 89/07255 | 8/1989 |
| WO | WO97/01122 | 1/1997 |
| WO | WO97/22901 | 6/1997 |
| WO | WO97/25678 | 7/1997 |
| WO | WO97/48999 | 12/1997 |
| WO | WO 98/32004 | 7/1998 |
| WO | WO98/47095 | 10/1998 |

\* cited by examiner

APPARATUS AND METHODS FOR VERIFYING THE LOCATION OF AREAS OF INTEREST WITHIN A SAMPLE IN AN IMAGING SYSTEM

CROSS-REFERENCE TO RELATED APPLICATION

This application incorporates herein by reference three U.S. patent applications field of even date herewith entitled Cytological Imaging System and Method, Cytological Stain Composition Including Verification Characteristic, and Cytological Stain Composition, and identified by Ser. Nos. 09/430,116, 09/430,117 and 09/430,196 respectively.

FIELD OF THE INVENTION

The invention relates generally to apparatus and methods for verifying the location of areas of interest within a sample. In particular, the invention relates to an apparatus for verifying the location of areas of interest within a cytological specimen, in an automatic imaging system.

BACKGROUND

Cytology is the branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "Pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

The conventional human review process for Pap smear analysis involves the manual screening of microscopic samples on a slide by a cytotechnologist. The cytotechnologist systematically views the tens of thousands of cells on a slide, typically at low magnification, to identify areas of interest, which are manually marked. The pathologist then views each identified area at high magnification, in order to distinguish abnormal cells by comparing the size, shape, and density of the cells located in the area against established criteria. The diagnostic Pap smear has suffered from a high false negative rate due to the tedium and fatigue associated with this exhaustive search. Because of the high false negative rate, many abnormalities remain undetected or are detected too late.

About one third of the false negative results have been associated with screening errors. In order to reduce screening errors, computer imaging has been applied to the automation of Pap smear analysis. Pre-screening systems have been developed which sort out the potentially abnormal specimens from among the high number of normal specimens, so that the number of normal specimens requiring full human reading can be reduced. These automated pre-screening systems can, however, also cause false readings because of inaccurate readings by the systems.

SUMMARY OF THE INVENTION

In accordance with a first embodiment, the invention includes a method for verifying a location of an area of interest within a sample including the steps of locating a datum mark on the sample, identifying the area of interest within the sample, determining the location of the area of interest relative to the mark, and locating again the datum. If a dimensional error in relocating the datum is less than a tolerance value, then the location of the area of interest is verified. The step of identifying the area of interest within the sample may include optically scanning the sample, and the tolerance value is between about ten microns and one thousand microns.

The method may also include the steps of identifying a plurality of areas of interest within the sample and ranking the plurality of areas of interest in an order. The sample may be a cytological specimen deposited on a glass slide mountable on a stage of an imaging system, with the areas of interest within the sample being abnormal cells. According to the method, if the location of the area of interest is not verified, the system rejects the sample as unreliable. Optionally, upon locating an area of interest, the method mat include placing a visible indicator proximate the area of interest identified within the sample.

According to another embodiment, a method for verifying a location of an area of interest within a sample may include the steps of locating a datum mark on the sample, assigning a reference coordinate value to a location of the mark, identifying an area of interest within the sample, assigning a coordinate value to the location of the area of interest, and spatially locating the mark, thereby determining a spatial offset value of the mark relative to the reference coordinate value, wherein the location of the area of interest is verified if the spatial offset value is less than a tolerance value. First locating the datum mark may be accomplished by centering the mark in a field of view of an optical instrument.

The method may further include storing in memory the coordinate value of the area of interest, transferring the sample to a review station, locating the datum mark, and setting a coordinate system of the review station based on a location of the mark.

Another method according to the invention for verifying a location of an area of interest within a cytological specimen on a slide loaded in an automated cytological imaging system includes the steps of placing the slide within an optical path of the imaging system, centering a datum mark on the slide within a field of view of the imaging system, assigning a reference coordinate value to a location of the mark, storing in memory the reference coordinate value, scanning the specimen to identify an area of interest within the specimen, centering the area of interest within the field of view of the imaging system, assigning a coordinate value to the area of interest, returning to the reference coordinate value location, spatially locating the mark a second time, and comparing the reference coordinate value to a coordinate value resulting from locating the mark the second time, thereby determining a spatial offset value of the mark, wherein the location of the area of interest is verified if the spatial offset value is less than a tolerance value.

The invention also includes a device for use in an imaging system for imaging a sample, the device being a slide having an area adapted for deposition of the sample thereon and at least two datum marks thereon, wherein the area is bounded, at least in part, by the at least two marks. The sample may be a cytological specimen and a location of each of the at least two marks is within a predetermined tolerance value. The device may also include an indicator placed on the slide at a location of a region of interest within the sample area, wherein the region of interest within the sample area indicates a location of an abnormal cell.

The invention further includes an imaging system for verifying a location of an area of interest within a sample, the imaging system including an optical system and a stage movable relative to the optical system, at least one of the optical system and the stage being operable to position the sample in an optical path of the optical system, wherein the imaging system is capable of spatially locating a datum mark on the sample and determining a spatial offset value of the mark relative to a nominal position thereof. The sample may be a cytological specimen deposited on a slide.

The invention also includes an apparatus for observing a sample and for verifying a location of an area of interest within the sample, the apparatus including an imaging system having a first optical system and a stage movable relative to the first optical system, at least one of the optical system and the stage being operable to position the sample in an optical path of the first optical system, a computer server in communication with the imaging system, and a review station in communication with the server, the review station including a second optical system, wherein the first and the second optical systems are operable to spatially locate a datum mark on the sample, and to standardize respective coordinate systems of the first optical system and the second optical system.

BRIEF DESCRIPTION OF THE DRAWINGS

This invention is described with particularity in the appended claims. The above and further advantages of this invention can be better understood by referring to the following description taken in conjunction with the accompanying drawings, in which:

DETAILED DESCRIPTION OF INVENTION

Figure 1:
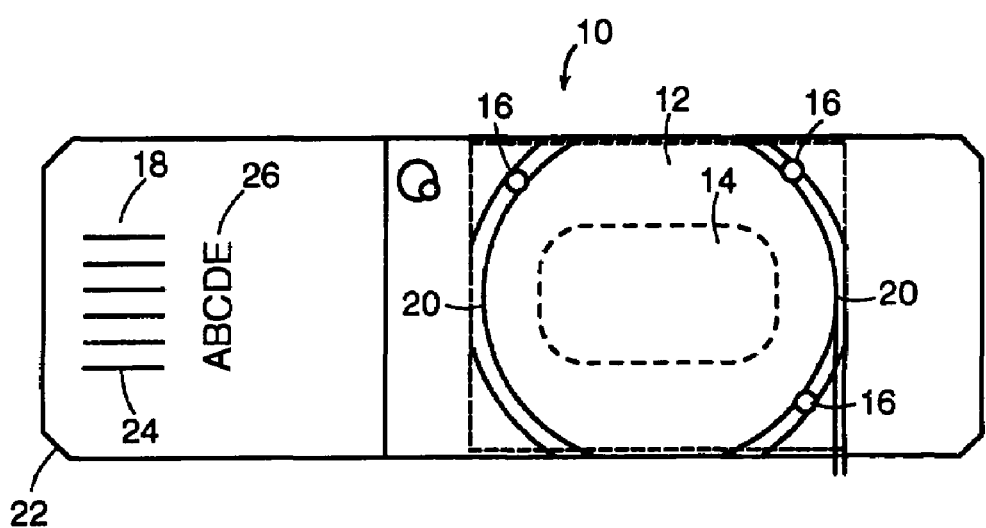
FIG. 1 shows a schematic diagram of one embodiment of a slide for use in accordance with the present invention.

FIG. 1 is a top view of a microscope slide 10 of the present invention. The slide 10 has a specimen area 12 adapted for the deposition of a sample, such as a cytological specimen 14, thereon. The slide 10 has toleranced dimensions and chamfered edges to facilitate handling and use of the slide 10 in automated calibrated equipment, such as imaging equipment. In one embodiment, the slide 10 is manufactured from glass and has a width of about one inch, a length of about three inches, and a thickness of about 0.04 inches.

The slide 10 has at least one datum mark 16 placed thereon, and may have two or more marks 16 placed thereon. The specimen area 12 may be bounded, at least in part by two marks 16. The mark 16 which may be referred to alternatively as a fiducial mark, is visible in a field of view of an optical instrument such as a microscope or a camera of an imaging system, and can be used as a reference datum or for measurement calibration purposes. In one embodiment, the slide may contain a first, a second, and a third fiducial mark 16, which are at non-collinear points on the slide 10. In one embodiment, the fiducial marks 16, each have a diameter of about 0.010 inches and have a location tolerance of about +/−0.015 inches. The marks 16 may be applied to the slide 10 by a silk screen process.

The bounded specimen area 12 may have an area of about one square inch. One end 18 of the slide 10 may be frosted or coated to facilitate marking and identification of the specimen 14 thereon. The frosted end 18 may have an area of about one square inch. A frosted annulus 20, defining an area to where the cells are transferred, may also be provided to facilitate scanning of sparse specimens. Also, one corner 22 of the frosted end 18 of each slide 10 may be chamfered to a greater degree than the other corners to ensure proper orientation of the slide 10 when being loaded in the imaging equipment.

The specimen deposited on the slide 10 is preferably a cytological specimen, but may be another type of specimen. In one embodiment of the invention, the cytological specimen is prepared from a cervical Pap smear. The Pap smear specimen is preferably a monolayer preparation, in which the cervical cells are disposed on the slide in a single layer to facilitate imaging and analysis. Equipment for preparing the monolayer specimens is disclosed in U.S. Pat. No. 5,143,627, the disclosure of which is incorporated herein by reference in its entirety.

The slide 10 may be marked with a barcode 24, as well as indicia 26 containing information necessary for matching the results of an analysis with the correct patient, for example identification of the patient from whom the specimen on the slide was obtained, or the doctor that provided the slide. The slide indicia 26 may have any of a variety of forms including one or more alphanumeric characters. It is generally desirable to mark the slides 10 with man-readable indicia so that the cytologist examining a fixed, stained specimen can readily identify the specimen and associated sample from which the specimen was prepared. Further, specimens are often archived and retained for extended periods. Accordingly, it is generally desirable to avoid using an indicia standard that may fall into disuse or become obsolete. While the slide indicia may be marked on an adhesive label bonded to the slide 10, subsequent processing such as fixing and staining may degrade the indicia or bond. Because specimen slides 10 are often archived in slide file drawers, it is generally desirable that the slide indicia 26 be oriented along the width or narrow dimension of the frosted end 18 so as to be readable without requiring removal of the slide 10 from the file drawer.

Figure 2:
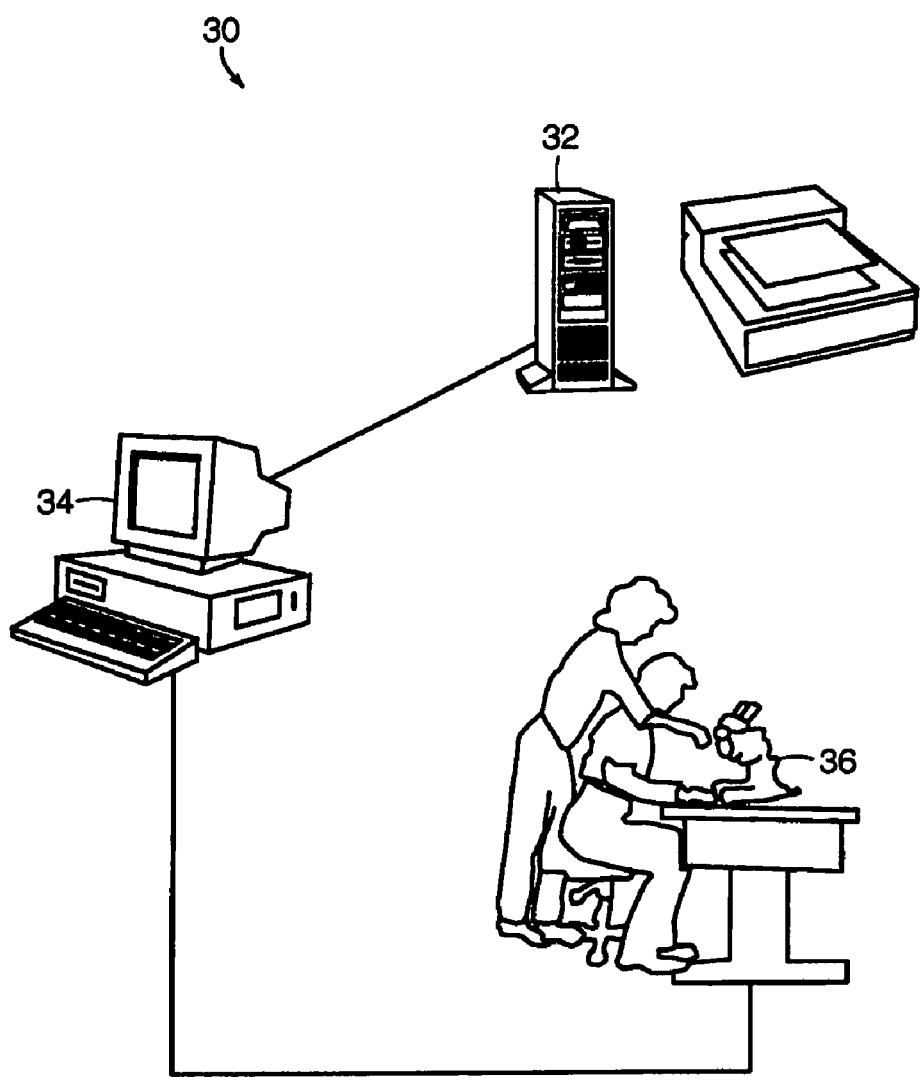
FIG. 2 shows an overall schematic diagram of one embodiment of a system of the present invention.

FIG. 2 shows a schematic diagram of one embodiment of an apparatus 30 of the present invention. The apparatus 30 includes at least one image processing system 32, a computer server 34, and at least one review station 36. The server 34 is in communication with both the image processing system 32 and the review station 36, and coordinates the operations of and data flow between the image processing system 32 and the review station 36.

Figure 3:
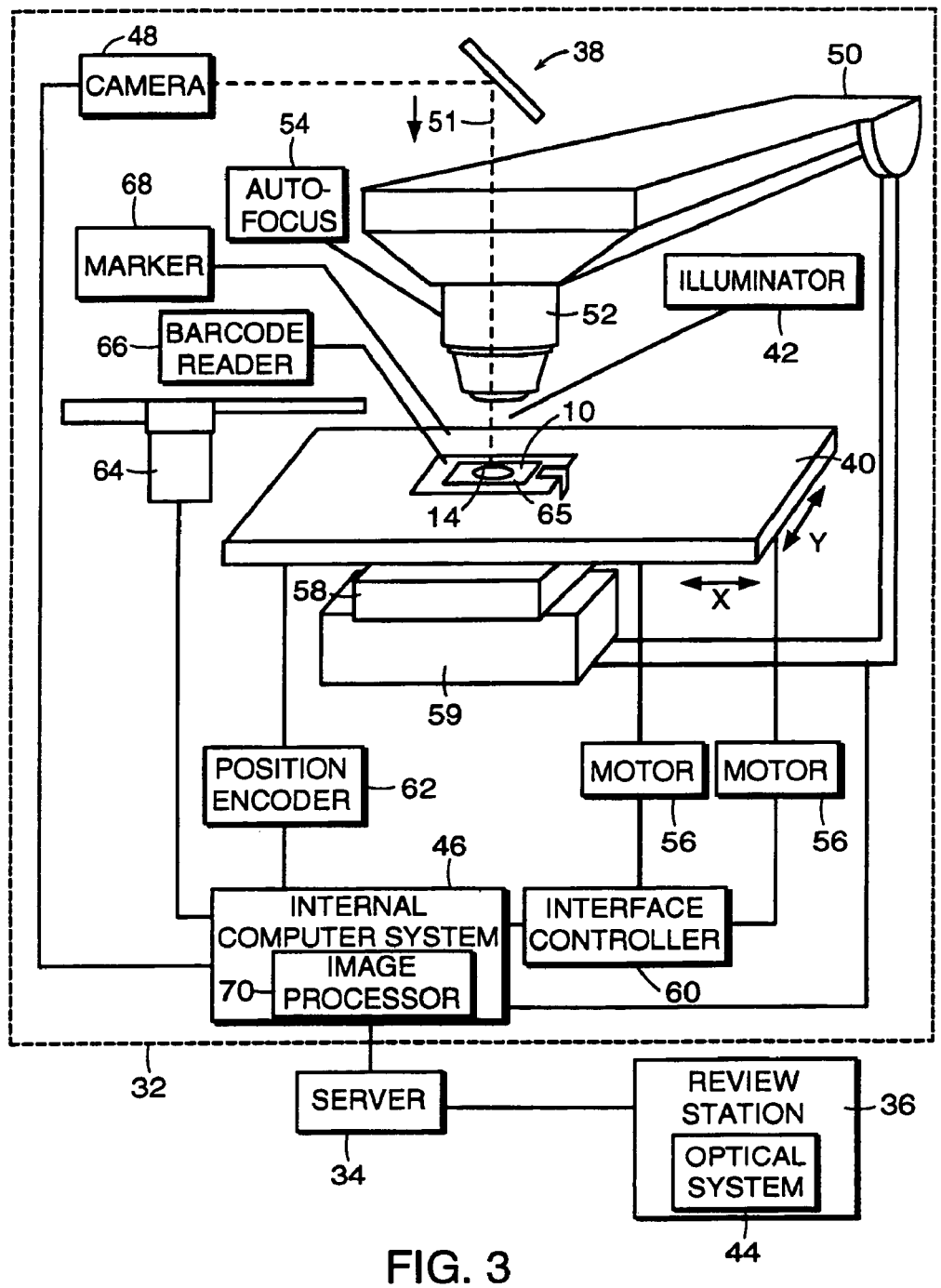
FIG. 3 is a more detailed schematic diagram of one embodiment of an apparatus of the present invention.

FIG. 3 is a more detailed illustrative diagram of one embodiment of the image processing system 32 of the present invention. The image processing system 32 includes a first optical system 38, and a slide stage 40 movable relative thereto. The review station 36 includes a second optical system 44, and is connected to the image processing system 32 via the server 34. An internal computer system 46 controls the first optical system 38 and is in communication with the server 34.

The first optical system 38 includes an electronic camera 48, such as a CCD camera 48, and a microscope 50. The microscope 50 is preferably an automated microscope. The automated microscope 50 may include features to provide fast, precise imaging of an area of a slide 10 positioned in the optical path 51 of the microscope 50, such as an autofocusing mechanism 54. The first optical system 38 may include one or more lens systems 52. An illuminator 42 may provide illumination for the specimen 14 deposited on the slide 10 and generally may illuminate the slide 10 from below the stage 40.

The stage 40 transports the specimen slide 10 into and within the optical path 51 of the microscope 50, in response to appropriate commands from the internal computer system 46. In one embodiment, a robotic slide handler 64 may, upon appropriate commands from the computer system 46, move the specimen slide 10 from a slide-holding cassette to the movable stage 40 for imaging the cells in the specimen, and then back to the cassette after imaging. A slide holder 65 fixedly and removably positions a slide 10 repeatedly in a precise location and orientation on the stage 40. The stage 40 may be motorized, and powered by one or more stage motors 56. The stage 40 may be mounted upon bearings 58, which in turn are mounted to the base 59 of the microscope 50. In one embodiment, the stage 40 is movable in an x-y plane, as shown in FIG. 3.

In one embodiment, an interface controller 60 in communication with the movable stage 40 may provide precise controlled movements of the slide 10 relative to the optical path 51 and viewing area of the microscope 50. The interface controller 60 controls the stage motors 56 by converting commands from the computer system 46 into appropriate signals that cause the motors 56 to move the stage 40 to prescribed locations. A position encoder 62 may detect the precise location of the stage 40, producing to the computer system 46 pulses representative of the movement or location of the stage. As known in the art, these pulses may be decoded by the computer system 46 in order to identify the location of the stage 40 in an imaging station coordinate system.

In one embodiment, the image processing system 32 includes a bar code reader 66 positioned to view the area of a slide containing the bar code 24, once the slide 10 has been transported to the movable stage 40 by the robotic slide handler 64 or has been loaded manually. In one embodiment, the image processing system 32 includes a marker 68 that automatically places a dot, a mark, or other visible sign in the areas of interest within the specimen where potentially abnormal cells may be located.

The review station 36 is connected to the image processing system 32 via the server 34, and may be remotely located. The review station 36 includes a second optical system 44. The second optical system 44 may include any and all features of the first optical system 38. In one embodiment, the second optical system 44 includes a microscope 50 that is connected to a movable stage and that is adapted for use by a human operator for visual inspection of the areas of interest identified by the image processing system 32.

In operation, the image processing system 32 performs an initial viewing and screening of a slide 10 on which a cytological specimen 14 is disposed, in order to make a preliminary assessment of the specimen 14. The image processing system 32 identifies for subsequent viewing by a cytotechnologist or pathologist the locations of those areas of interest on the slide that potentially are most relevant. In order to prevent false negative readings in a Pap smear screen, the locations of areas that are identified by the image processing system 32 in this preliminary screening must be accurate to within an acceptable error margin. Incorrect handling or positioning of the slides during the scanning process make cause errors in the locations of the identified areas and subsequent misreading at the review station 36.

According to this invention, the fiducial marks 16 on the slide 10 are used to verify that the slide 10 has been loaded properly, as well as to verify the reliability of the locations of the identified areas of interest within the specimen. The slide 10, marked with two or three fiducial marks 16, and having a specimen 14 deposited thereon, is fixedly positioned and held on the movable stage 40 by the slide holder 65. Next, the automated microscope 50 searches for the first fiducial mark 16. Nominal locations of the fiducial marks 16 are preprogrammed into the computer system 46. The computer system 46 searches for the fiducial marks 16 by sending control signals to the interface controller 60 to move the stage 40 to the estimated location of the first fiducial mark 16. In response, the stage motors 56 move the stage 40, until the desired fiducial mark 16 is moved within a field of view of the microscope 50. Generally, the portion of the slide 10 that is viewed constitutes a field of view of the microscope 50. The first fiducial mark 16 may then be centered automatically within the field of view of the microscope 50, to account for minor errors due to tolerances and other minor errors.

The computer system 46 may assign a reference coordinate value, for example (0,0), to the spatial location of the first fiducial mark, and store the reference coordinate value and stage location in memory. The relative position of the second fiducial mark 16 with respect to the first fiducial mark 16 has also been preprogrammed into the computer system 46. Therefore, once the position of the first fiducial mark 16 is known, the computer system 46 locates the second fiducial mark 16. The computer system 46 causes the motors 56 to move the stage 40 to the nominal location of the second fiducial mark 16, after which the second fiducial mark 16 may be centered automatically within the field of view of the microscope 50. The computer system 46 assigns another reference coordinate value, for example $(x\_1, y\_1)$, to the spatial location of the second fiducial mark, and stores the reference coordinate value in its memory. The reference coordinate values (0,0) and $(x\_1, y\_1)$ define a two-dimensional coordinate system, with respect to which selected areas within the specimen 14 may subsequently be identified. In an embodiment where the slide 10 has more than two fiducial marks, the image processing system 32 may look for the third fiducial mark 16, and any other fiducial mark 16 on the slide 10 and similarly center and record their respective locations.

The image processing system 32 then scans the entire specimen 14, typically containing tens of thousands of cells, in order to determine the potentially most relevant areas of interest within the sample, such as cells with excessively large and/or dark nucleii. During the scanning process, the computer system 46 manipulates the movable stage 40 by generating appropriate control signals that cause the motors 56 to move the stage 40 in such a way that the various areas of the slide 10 are positioned in the optical path 51 of the microscope 50. As the stage 40 is moved by the motors 56 in response to the signals from the computer system 46, the image viewed by the lens system 52 of the microscope 50 also is moved, so as to view another portion of the slide 10. The image processing system 32 scans the specimen 14 by moving the movable stage 40, and therefore the field of view of the microscope 50, across the entire specimen 14. The stage 40 may be moved so that the field of view of the microscope 50 is moved across the entire scan area.

The electronic camera 48 is positioned in the optical path 51 of the microscope 50, so as to capture an electronic image of the area of the slide 10 being viewed. In one embodiment, the field of view of the camera is 640 pixels in width by 480 pixels in length. Each pixel is on the order of about 0.74 microns. The camera 48 then feeds the electronic image to the computer system 46 so that the computer system 46 can perform an analysis of the cells appearing in the imaged area. The electronic image is preferably represented by electrical signals which can be processed by image processors 70 within the computer system 46.

The computer system 46 performs the necessary analysis in order to determine whether malignant or pre-malignant cells are contained in the specimen, based upon their appearance. The computer system 46 may rely on feature extraction algorithms, which attempt to select and to measure some feature within the image, e.g., the shape or the size of the cell nucleus, or the density of cells within the area. For instance, an unusually large sized nucleus may indicate cell abnormality. Based on pre-programmed criteria, the computer system 46 makes an identification of those areas within the specimen 14 most likely to contain certain features of interest, such as cell abnormalities. Typically, the computer system 46 identifies between about 10 to about 30 areas of interest within the cytological specimen, however the number of areas of interest may vary from 0 to 100 or more.

Once the areas of interest have been identified, the computer system 46 ranks the identified areas based on the degree to which each area has characteristics more likely found in a typical premalignant or malignant cell than in a typical benign cell. The computer system 46 then assigns to each identified area a coordinate value in the coordinate system defined by the reference coordinate values, thereby determining the relative location of each area with respect to the first and second fiducial points. The computer system 46 then stores in memory a file containing the coordinate values of each area of interest. The image processing system 32 also communicates this data with the server 34. In one embodiment, a marker 68 may place a visible sign on the slide at the locations of each identified area of interest to aid the pathologist in identifying the potentially malignant cells at the review station 36.

In order to verify the accuracy of the locations of the identified areas of interest, the computer system 46 determines a spatial offset value of the fiducial marks 16 after the slide has been scanned. The computer system 46 recalls from memory the actual coordinate values for the first and the second fiducial marks. The computer system 46 then sends appropriate control signals to move the stage to a location corresponding to the measured reference coordinate value for the first fiducial mark, and thereafter to a second location corresponding to the measured reference coordinate value for the second fiducial mark. The computer system 46 expects the first fiducial mark 16 to be located at the first position, and the second fiducial mark 16 to be located at the second position. Because of a margin of error inherent in any mechanical system, the fiducial marks 16 are typically displaced by some minor spatial offset value. If the spatial offset value is greater than a predetermined tolerance value, either the slide moved relative to the stage during scanning, the system lost position, or some other error occurred which brings into question the validity of the stored locations of the identified areas of interest. Accordingly, the slide is rejected as being the result of an unreliable scan. In one embodiment, the tolerance value is in the range of about +/−10 microns to about +/−1000 microns.

The fiducial mark may be spatially offset for a variety of reasons. Causes for the offset may include incorrect loading or positioning of the slide in the beginning of the scanning process, or movements of the slide 10 relative to the movable stage 40, such as slipping or jarring of the slide during the scanning process. Other causes of error may include excess backlash in position of the movable stage during the scanning, any kind of physical manual intervention, or excess mechanical vibrations within the image processing system 32.

If the spatial offset value is within an acceptable tolerance value, the slide is verified and can be accepted for further review by a cytotechnologist or a pathologist at the review station 36. The above-described verification process is undertaken separately for each slide 10. If the spatial offset value of the fiducial marks 16 on the slide 10 is less than the tolerance value, the locations of the areas of interest are verified to be reliable within an acceptable error margin. The slide 10 is therefore transferred to the review station 36.

In the review station 36, the once-scanned slide 10 is submitted to review by a human operator, who may be a cytotechnologist doing another preliminary screen for a pathologist, or may a pathologist doing a final screen. Either way, the image processing system 32 has electronically limited for the human operator the areas within the specimen at which the human operator needs to look.

The review station 36 typically has an internal computer system that can access the server 34, and that is connected to a microscope and a movable stage. The human operator lets the microscope read the bar code of the slide 10, then starts processing the slide 10 by physically looking for the first and the second fiducial mark on the slide 10. When the human operator finds the fiducial mark 16 on the slide, he centers the mark 16 within the field of view of the microscope, and sets the coordinates of the first fiducial mark 16 to (0,0). The server then provides the coordinates that were assigned to the areas of interest for that slide by the image processing system 32.

The human operator instructs his microscope to go to the first assigned coordinate. After examining the area corresponding to the first assigned coordinate, the operator hits a NEXT button, which sends command signals to the microscope to go to the next assigned coordinate. In this manner, the operator goes through the entire range of locations that have been selected for review by the image processing system 30. If the human operator is a cytotechnologist, he may further identify certain areas if he thinks that a cell or a cluster of cells is of interest. After the cytotechnologist has reviewed the last location of interest, he hits the DONE button. These areas are submitted to review by a pathologist, who makes the final determination as to whether or not the areas of interest contain malignant cells. Alternatively, the human operator in the review station may be the pathologist himself, who reviews each of the areas corresponding to the coordinates stored in the server 34 by the image processing system 32, and makes a final determination for each area. After review, the review station 36 may optionally find the fiducial marks 16 again to verify that the slide did not move and no other coordinate system malfunction occurred during review of the slide 10.

In one embodiment, a plurality image processing systems 32 and review stations 36 may be in use in coordination via a common server 36. As a slide 10 is transferred from one image processing system 32 to another, or from one image processing system 32 to one of the plurality of remote stations 34, information regarding the locations of areas of interest on the slide may be stored and shared among the plurality of image processing systems 32 and review stations 36, so that any of the equipment can be used interchangeably with a high degree of confidence that the proper areas are being reviewed by the pathologist.

Figure 4:
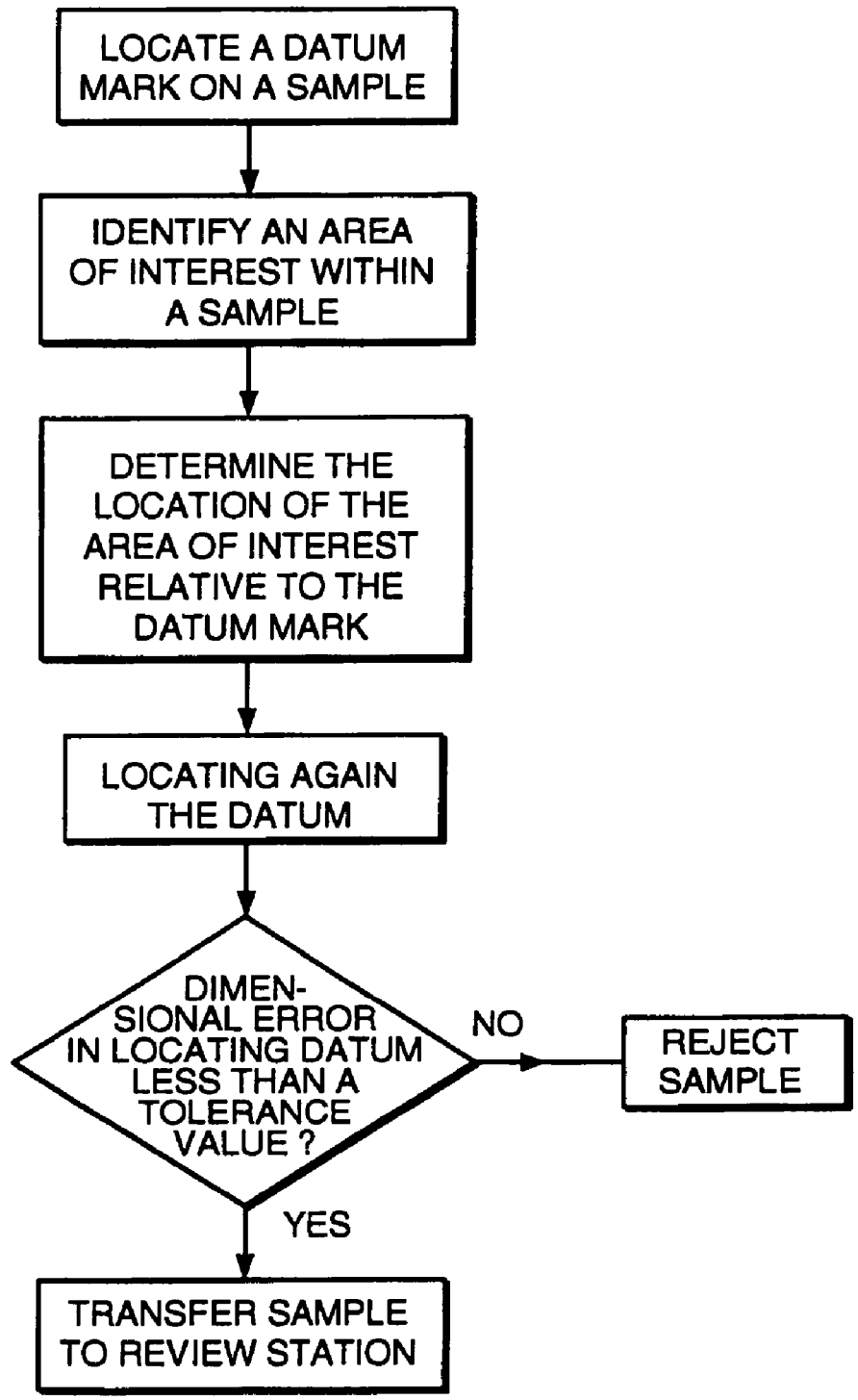
FIG. 4 shows a schematic flow chart illustrating the steps of operation in a method, according to the present invention, of verifying location of areas of interest in a sample.

In sum, FIG. 4 illustrates in a schematic flow chart a summary of the steps of operation in a process for verifying location of areas of interest in a sample, according to the present invention. The first step includes locating a datum mark on a sample. The datum mark may a fiducial mark printed on a slide upon which a cytological specimen has been deposited, as explained earlier. The second step includes identifying an area of interest within a sample. For example, a specimen slide may be optically scanned by an automated microscope, in order to identify areas that potentially contain malignant cells. The third step includes determining the location of the area of interest relative to the datum mark. The fourth step includes locating again the datum mark. The fifth step includes determining whether a dimensional error in locating the datum mark is less than a tolerance value. If so, the sample is transferred to the review station, otherwise the sample is rejected.

While the invention has been particularly shown and described with reference to specific preferred and exemplary embodiments, it should be understood by those skilled in the art that various changes in form and detail can be made therein without departing from the spirit and scope of the invention as defined by the appended claims.

What is claimed is:

1. A method for verifying a location of an area of interest within a sample, the method comprising:
   locating a datum mark on the sample;
   identifying the area of interest within the sample;
   determining the location of the area of interest relative to the mark; and
   relocating the datum, wherein the location of the area of interest is verified if a dimensional error in locating the datum relative to relocating the datum is less than a tolerance value.

2. The method according to claim 1 wherein the identification of the area of interest within the sample comprises optically scanning the sample.

3. The method according to claim 1 wherein the tolerance value is between about ten microns and one thousand microns.

4. The method according to claim 1 further comprising:
   identifying a plurality of areas of interest within the sample; and
   ranking the plurality of areas of interest in an order.

5. The method according to claim 1 wherein the sample comprises a cytological specimen deposited on a slide.

6. The method according to claim 5 wherein the area of interest within the sample comprises an abnormal cell.

7. The method according to claim 1 wherein the sample is mounted on a stage.

8. The method according to claim 1 further comprising rejecting the sample if the location of the area of interest is not verified.

9. The method according to claim 1 further comprising placing a visible indicator proximate the area of interest identified within the sample.

10. A method for verifying a location of an area of interest within a sample, the method comprising:
    locating a datum mark on the sample;
    assigning a reference coordinate value to a location of the mark;
    identifying an area of interest within the sample;
    assigning a coordinate value to the location of the area of interest; and
    spatially relocating the mark, thereby determining a spatial offset value of the relocated mark relative to the reference coordinate value;
    wherein the location of the area of interest is verified if the spatial offset value is less than a tolerance value.

11. The method according to claim 10 wherein the first locating of the datum mark comprises centering the mark in a field of view of an optical instrument.

12. The method of claim 10 further comprising storing in memory the coordinate value of the area of interest.

13. The method according to claim 10 further comprising:
    transferring the sample to a review station;
    locating the datum mark; and
    setting a coordinate system of the review station based on a location of the mark.

14. A method for verifying a location of an area of interest within a cytological specimen on a slide located in an automated cytological imaging system, the method comprising:
    placing the slide within an optical path of the imaging system;
    centering a datum mark on the slide within a field of view of the imaging system;
    assigning a reference coordinate value to a location of the mark;
    storing in memory the reference coordinate value;
    scanning the specimen to identify an area of interest within the specimen;
    centering the area of interest within the field of view of the imaging system;
    assigning a coordinate value to the area of interest;
    returning to the reference coordinate value location;
    spatially relocating the mark; and
    comparing the reference coordinate value to a coordinate value resulting from spatially relocating the mark, thereby determining a spatial offset value of the mark, wherein the location of the area of interest is verified if the spatial offset value is less than a tolerance value.

15. The method of claim 14 wherein the method is performed while the slide is continuously mounted within the imaging system.

16. A method for verifying a location of an area of interest within a cytological specimen on a slide located in an automated cytological imaging system, the method comprising:
    locating a datum mark on the sample;
    identifying the area of interest within the sample;
    determining the location of the area of interest relative to the mark; and
    relocating the datum, wherein the location of the area of interest is verified if a dimensional error in locating the datum relative to relocating the datum is less than a tolerance value.

17. The method of claim 16, wherein the method is performed while the slide is continuously mounted within the imaging system.

* * * * *